United States Patent [19]
Beason et al.

[11] Patent Number: 5,288,265
[45] Date of Patent: Feb. 22, 1994

[54] FOLDING GAMBREL SUPPORT

[76] Inventors: Lynn Beason, Box 481, Circle, Mont. 59215; Donald O. Danell, 1488 Washington Ave., Havre, Mont. 59501

[21] Appl. No.: 982,560

[22] Filed: Nov. 27, 1992

[51] Int. Cl.[5] .................................................. A22C 25/18
[52] U.S. Cl. .................................... 452/192; 452/187; 452/189
[58] Field of Search ............... 452/187, 190, 191, 192, 452/189

[56] References Cited

U.S. PATENT DOCUMENTS

| | | | |
|---|---|---|---|
| 384,433 | 6/1888 | Ekker | 452/192 |
| 1,023,148 | 4/1912 | Hartman | 452/189 |
| 4,027,357 | 6/1977 | Morris | 452/192 |
| 5,071,389 | 12/1991 | Castle et al. | 452/192 |

FOREIGN PATENT DOCUMENTS

132551  7/1902  Fed. Rep. of Germany ...... 452/191

*Primary Examiner*—Willis Little
*Attorney, Agent, or Firm*—Douglas L. Tschida

[57] ABSTRACT

A hinged gambrel support which folds and latches for storage. Each of a pair of support arms include one or more gambrel retainer projections, mating latch surfaces and tie off apertures. A bored axle at one arm mates with and is retained to the other arm at a recessed bore via a split ring fastener. Latch surfaces at the retainer projections interlock upon folding the arms for storage. In an alternative construction the arms are length adjustable.

18 Claims, 7 Drawing Sheets

FOLDING GAMBREL SUPPORT

BACKGROUND OF THE INVENTION

The present invention relates to butchering or meat processing hangers and, in particular, to a portable, folding gambrel support.

A problem inherent with butchering or dressing domestic or wild meat bearing animals is that of supporting the animal in a fashion which facilitates the removal of the skin and the sectioning the prepared carcass. Varieties of so called "meat hooks" have been developed for use in commercial processing facilities, whereby separate legs of the animal may be secured from separate hooks, which hooks in turn are suspended from an overlying support.

When field dressing wild animals, such as deer, antelope, elk, bear and other large game animals, a support structure is typically not available which accommodates separate leg hooks. Instead, a tree limb is typically used and from which a mechanical hoist or rope is suspended. The rope is attached to a bar which is inserted between the gambrels of the animal to spread apart the legs and permit processing. Various spreader bars are commercially available, but all of which essentially provide a permanent triangular wire or metal frame. The widest portions of these frames provide bent uprights which project to restrain the gambrels of a supported animal and limit the maximum spreading of the legs. The weight of the animal otherwise is directed outward via the angulating rails of the triangular support.

A shortcoming of spreader bar assemblies is that the bars do not lend themselves to ready storage. That is, the assemblies are constructed at fixed lengths. Depending upon the tempering and thickness of the materials, such assemblies also tend to bend and deform when subjected to extraneous pressures. Such pressures can occur during skinning, when one or more sportsmen pull or push to remove the hide from the animal.

SUMMARY OF THE INVENTION

It is accordingly a primary object of the present invention to provide a meat processing or butchering support which spreads to facilitate the separation of the gambrels of an animal during processing, yet which collapses to facilitate later storage.

It is a further object of the invention to provide a butchering support which includes a pair of hinged support arms.

It is a further object of the invention to provide a butchering support wherein the arms mate with one another at a bored axle projection and to which the arms are secured with a semi-permanent fastener.

It is a further object of the invention to provide a butchering support having arms which include stop surfaces to limit and prevent over-rotation of the arms.

It is a further object of the invention to provide a butchering support including projecting appendages and apertures to facilitate the retention of each gambrel to each arm and/or support accessory items such as lanterns and other camp accessories.

It is a still further object of the invention to provide a butchering support wherein the arms are length adjustable.

Various of the foregoing objects, advantages and distinctions of the invention are obtained in a presently preferred construction which includes a pair of molded plastic support arms. The arms are constructed of fiber reinforced plastics. One end of each arm includes a pair of projections and between which opposite sides of each gambrel are restrained. Apertures provided along the body of each arm facilitate support of accessory camp items and/or provide tie-off points for rope restrainers secured about the gambrels.

The mating inner end of one arm provides a bored axle, which projects from a planar face of the arm, and adjacent vertical stop surfaces. The inner end of the second arm includes a bored recess which mounts about the axle and includes cooperating vertical stop surfaces. The stop surfaces limit over-rotation of the arms when fully opened. The arms fold within the plane of the arms, such that surfaces of ones of the gambrel projections mate and latch when folded.

Still other objects, advantages and distinctions of the invention will become more apparent upon reference to the following detailed description and appended drawings. To the extent various modifications and improvements have been considered, they are described as appropriate. The description should not be strictly construed in limitation of the invention, which rather should be interpreted within the scope of the following appended claims.

DESCRIPTION OF THE PREFERRED EMBODIMENT

Figure 1:
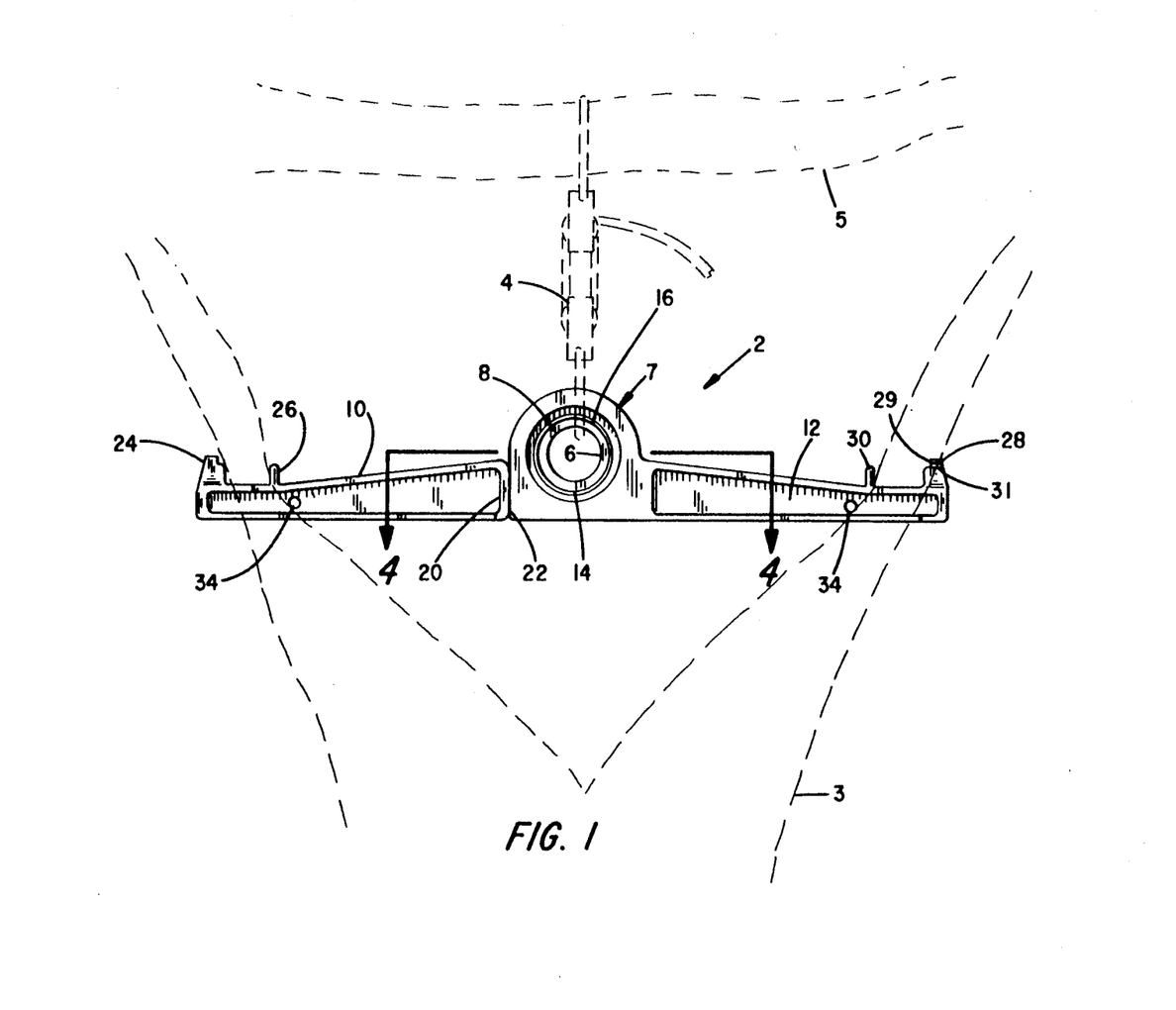
FIG. 1 shows a plan view of the inventive folding, meat processing support in relation to a supported animal, pulleyed hoist and tree limb, which are depicted in dashed line.
Figure 2:
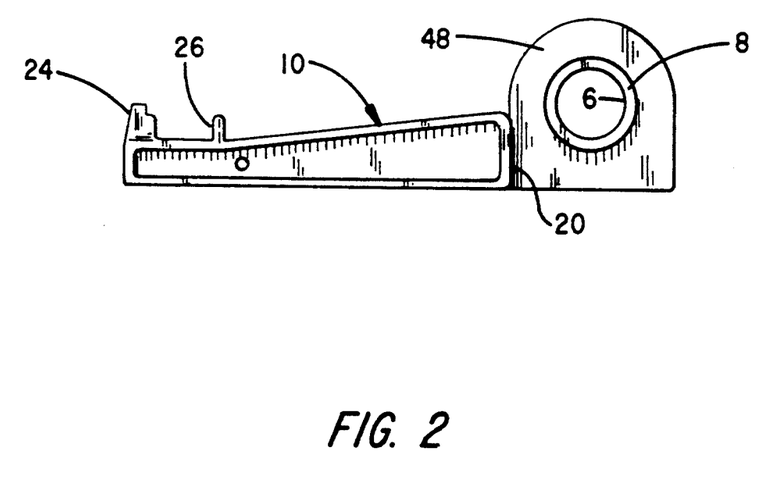
FIG. 2 shows a plan view of the axle containing support arm.
Figure 3:
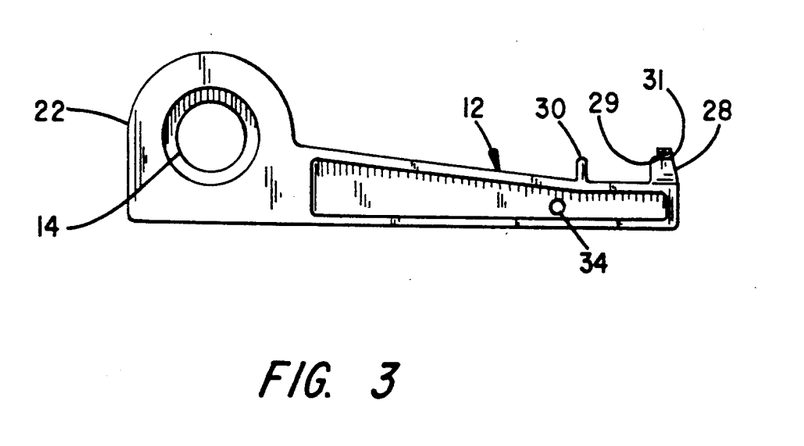
FIG. 3 shows a plan view of the retainer containing support arm.
Figure 5:
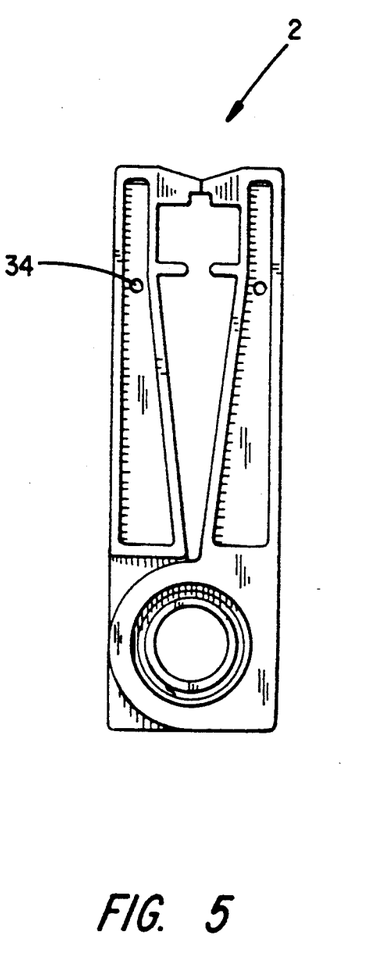
FIG. 5 shows a plan view of the support of FIG. 1 when folded closed.

Referring to FIG. 1, an isometric drawing is shown of the meat processing or butchering support 2 of the present invention as it appears when it is spread to its support position. The support 2 is shown as it normally appears during field dressing situations. The support 2 is then typically suspended from a multi-pulleyed rope hoist or lifting assembly 4 that is secured to a permanent support such as a tree limb 5, garage rafter, swing set or other convenient overlying support. A portion of a meat bearing animal 3, such as a deer, is shown as it typically appears when suspended from the support 2. In contrast, FIG. 5 depicts the support 2 as it appears when folded to a closed or storage condition.

Figure 4:
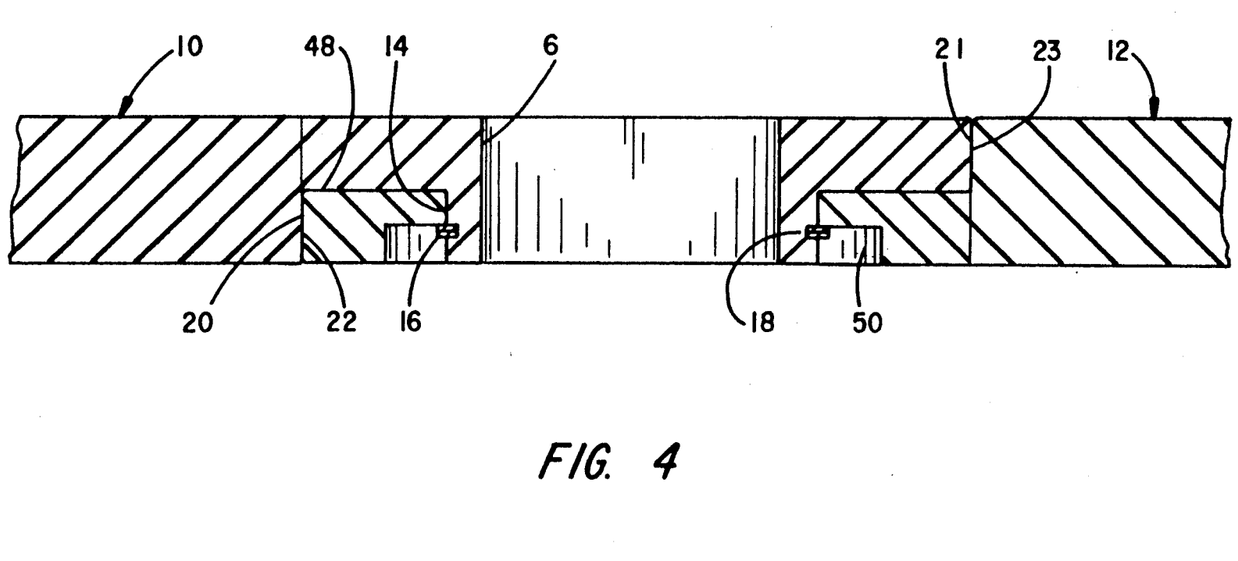
FIG. 4 shows a cross section view taken along section lines 4—4 of FIG. 1.

In normal use, the support 2 is retained to the lifting assembly 4 at a center aperture 6. The aperture is defined as a bore 6 which extends through an axle 8 which transversely projects from a support arm 10. A second support arm 12 hinge mounts to the arm 10 at a hinge joint 7. A bore 14 formed at the inner end of the arm 12 mounts about the axle 8 and the arm 12 is restrained to the axle 8 via a snap ring 16 which fits within a slot 18 let into the axle 8 (reference FIG. 4).

A vertical stop shoulder or surface 20 projects from the front surface of the arm 10 and mates with a vertical surface 22 of the arm 12 to limit rotation of the arms 10 and 12 relative to one another. A pair of similarly cooperating surfaces 21, 23 are provided on the opposite side of the support (reference FIG. 4). Preferably, the arms do not rotate past horizontal. Depending upon the relative positionings and angular orientations of the pairs of stop surfaces 20, 22 and 21, 23 to one another, the relative rotation of the arms 10, 12 can be varied.

Projecting from the outer end of each of the arms 10 and 12 are a pair of projections 24, 26 and 28, 30. The outermost projections 24 and 28 prevent a previously slit gambrel of the animal from sliding outward past the projections 24, 28. The projections 26, 30 prevent the legs from sliding along the opened support toward the hinge joint 7. Apertures 34 are also provided in the arms 10, 12 to permit the mounting of a length of rope to tie-off each gambrel. Mating longitudinal slots or recesses 29 are provided in each projection 24, 28 (only one of which is shown) which interlock with one another upon folding the arms together to latch the arms. A stop surface 31 at each arm limits arm rotation upon closure as in FIG. 5.

A particular advantage of the present processing support 2 is that during normal use and prior to spreading the legs of the animal, the arms 10 and 12 can be inserted into the previously slit gambrels with the support 2 only partially folded open. Upon raising the support 2, with a support rope or the pulley assembly 4, which was previously mounted to a suitable support, the weight of the animal causes the arms 10, 12 to rotate to their fully open positions and simultaneously spread the legs of the animal 3 to facilitate processing. The sportsman or butcher is thereby assured that adequate separation is attained to accommodate processing of the carcass. As presently constructed, the support 2, when fully rotated open, spans approximately 26 inches. It is to be appreciated, however, that for larger game animals, the arms 10, 12 can be lengthened to permit greater separation.

Figure 6:
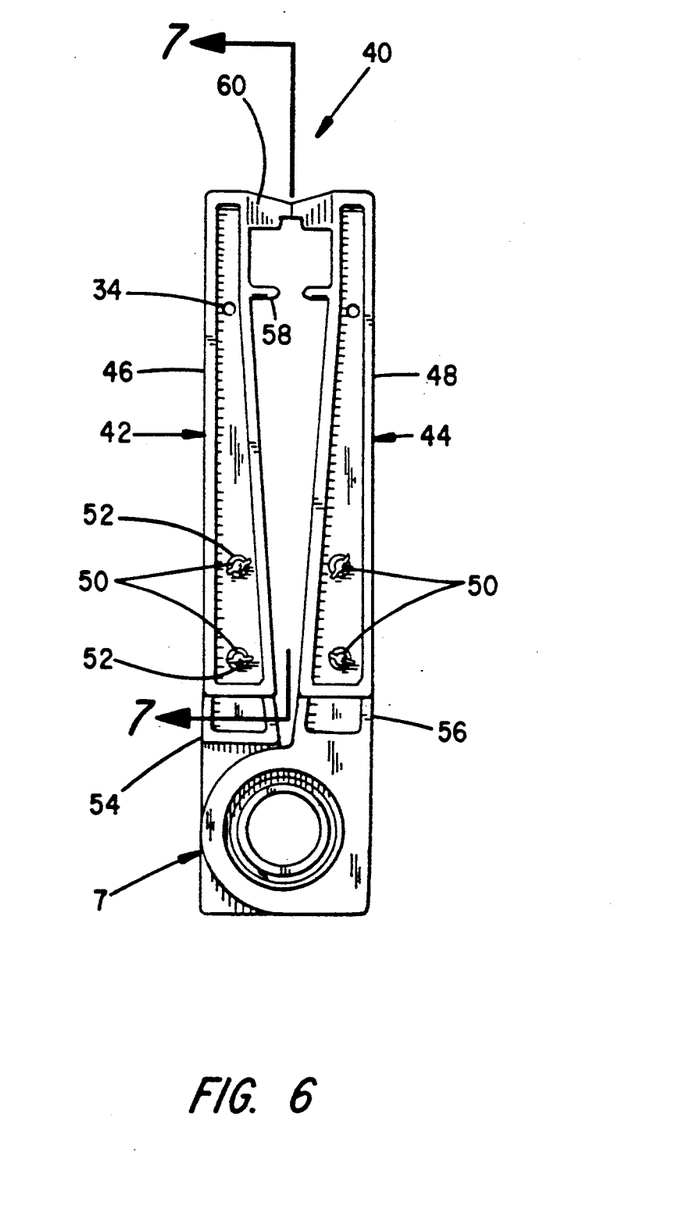
FIG. 6 shows a plan view of an alternative support having length adjustable arms.
Figure 7:
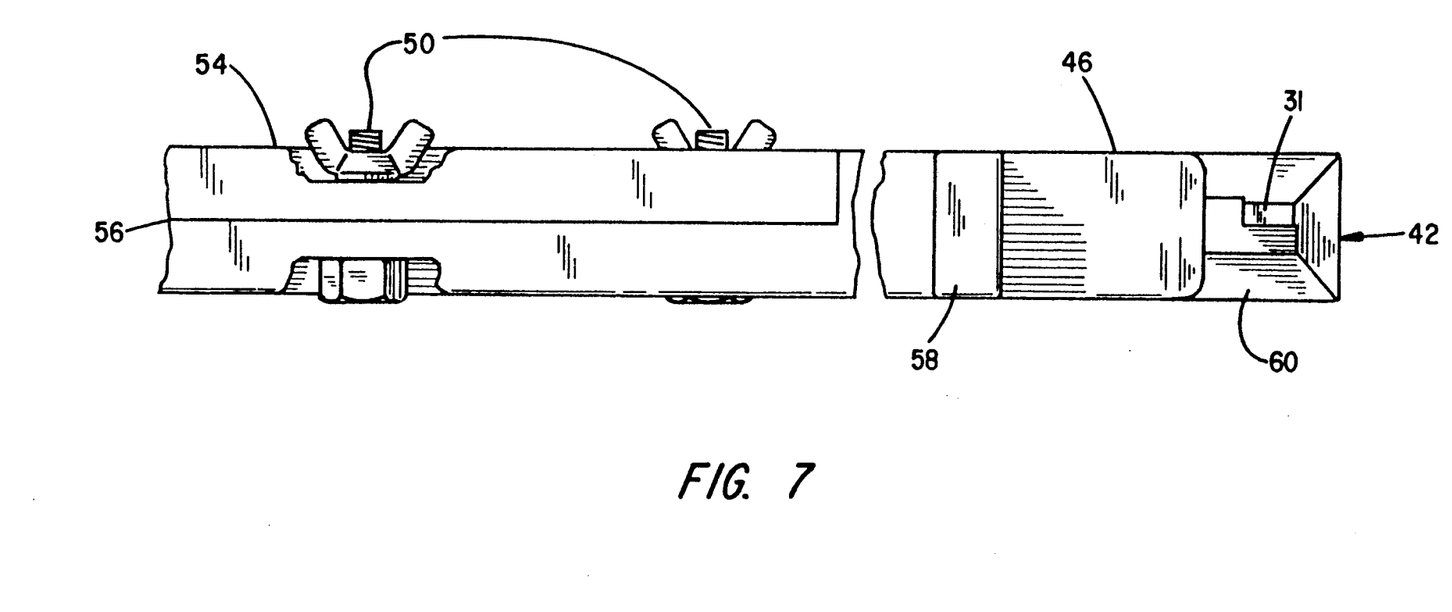
FIG. 7 shows a cross section view taken along section lines 7—7 of FIG. 6.

In the latter regard and as an alternative to constructing separate supports of predetermined fixed lengths, FIGS. 6 and 7 depict a support 40 having modified arms 42, 44 which permit adjustable expansion. In particular and with reference to FIG. 6, the arms 42 and 44 are constructed to include length adjustable ends 46, 48. The specific length of each arm 42, 44 is determined via pairs of threaded fasteners 50 which are mounted through aligned pairs of holes 52 let into each of the arms 42 and 44. Folding arm portions 54, 56 of each arm 42, 44 mate at a center hinge joint 7. Each arm portion 54, 56 can contain any number of pairs of holes 52 and/or overlapping slots to facilitate length adjustment.

Unused holes 52 can also be used to facilitate the securing of each gambrel to the support 40. Alternatively, other accessory items found about a hunting camp can be supported from the holes 34 and any unused holes 52, such as when the support is hung from the ridge pole of a tent. For example, such accessories might comprise a lantern, cooking paraphernalia or wet clothing.

FIG. 7 depicts a top plan view showing more of the details of the adjustable construction of the arm 42, although it is to be appreciated the same construction exists at the arm 44. More apparent from this view is the manner of attachment of the expandable end piece 46 to the inner piece 54 and the vertical surface 56 at which the arm pieces mate. Depending upon which pairs of the holes 52 are aligned in the arm pieces 46, 54 an appropriate length can be obtained. Once the arm length is adjusted and the support 40 is rotated open at the hinge joint 7, the gambrel restraints 58, 60 contain the animal as described for the support 2 of FIGS. 1–5. Although one exemplary arrangement is depicted for extending the span of the support arms 42, 44, it is to be appreciated still other constructions may be suggested to those skilled in the art.

Although, too, the invention has been described with respect to presently preferred constructions, it is to be appreciated still other constructions may be suggested to those skilled in the art. Accordingly, the following claims should be interpreted to include all those equivalent constructions within the spirit and scope thereof.

What is claimed is:

1. A meat processing support comprising:
   a) first and second arms, wherein each arm includes a first projection which projects from a peripheral edge, wherein one of said first and second arms includes a bored axle which projects from the one of said first and second arms, wherein the other of said first an second arms includes an aperture which concentrically mounts about said axle and further including;
   b) means for restraining said first and second arms to one another; and
   c) stop means for limiting the rotation of said first and second arms between a folded position and an open position, whereby a portion of the carcass of a supported animal is retained adjacent to the first projection of each of said first and second arms when folded to said open position.

2. Apparatus as set forth in claim 1 wherein said restraining means comprises an annular notch let into a surface of said axle and a resilient ring which mounts into said notch.

3. Apparatus as set forth in claim 2 wherein the other of said first and second arms includes a recess concentric to said aperture and within which recess said resilient ring mounts.

4. Apparatus as set forth in claim 1 wherein said stop means comprises surfaces at said first and second arms which abut with one another and limit rotation of the arms at the open position to a substantially coaxial relationship.

5. Apparatus as set forth in claim 1 including a plurality of apertures at said first and second arms.

6. Apparatus as set forth in claim 1 wherein each of said first and second arms includes a second projection displaced from the first projection and between which first and second projections the animal carcass is supported.

7. Apparatus as set forth in claim 1 including means for latching said first and second arms to one another when rotated to the folded position 8. Apparatus as set forth in claim 7 wherein said latch means comprises a recess let into one of said first and second projections of each of said first and second arms and wherein the projections containing the recesses overlap one another at the folded position to interlock and secure the first and second arms to one another.

9. Apparatus as set forth in claim 1 wherein said first and second arms are formed of a molded plastic.

10. Apparatus as set forth in claim 1 wherein each of said first and second arms includes means for varying the length of each of said first and second arms.

11. Apparatus as set forth in claim 10 wherein each of said first and second arms is comprised of first and second portions which portions include surfaces which mate with one another at a plurality of positions and means for fastening the portions to one another at each position, whereby the length of each arm may be adjusted.

12. A meat processing support comprising:
a) a first arm including at least a first projection which extends from a peripheral edge, wherein an opposite end of the first arm includes an axle which transversely extends from a surface of reduced thickness, which surface also includes a first stop surface, wherein said axle includes a longitudinal bore and wherein said axle further includes an annular slot;
b) a second arm including at least a second projection which extends from a peripheral edge, wherein an opposite end of the second arm includes a surface of reduced thickness having a bore transversely extending therethrough and a recess concentrically surrounding said bore and further including a second stop surface; and
c) a resilient ring which mounts to said annular slot upon positioning said axle to extend through the bore and recess of said second arm and wherein said first and second surfaces limit the relative horizontal rotation of said first and second arms upon rotating said first and second arms into coaxial alignment.

13. Apparatus as set forth in claim 12 wherein said first and second projections each include a recess which recesses align upon rotation of said first and second arms to a closed position to latch the arms to one another.

14. Apparatus as set forth in claim 12 wherein each of said first and second arms include first and second portions and means for length adjustably securing the first and second portions to one another to define first and second arms of a desired length, whereby the separation between said first and second projections can be varied.

15. A meat processing support comprising:

a) a first arm including first and second displaced projections which extend from a peripheral edge, wherein an opposite end of the first arm includes a transversely projecting axle and a first stop surface, wherein said axle includes a longitudinal bore and wherein said axle further includes an annular slot;
b) a second arm including a second and third projections which extend from a peripheral edge, wherein an opposite end of the second arm includes a bore and a second stop surface; and
c) means for securing said first and second arms to one another upon positioning said axle to extend through the bore, such that said first and second arms are rotatable between closed position and an open position and wherein said first and second surfaces limit the relative horizontal rotation of said first and second arms upon rotating said first and second arms into coaxial alignment at said open position.

16. A meat processing support comprising:
a) first and second arms, wherein each arm includes means for restraining a portion of an animal carcass to the arm, wherein one of said first and second arms includes a bored axle which projects from the one of said first and second arms, and wherein the other of said first an second arms includes an aperture which concentrically mounts said axle;
b) means for restraining said first and second arms to one another; and
c) stop means for limiting the rotation of said first and second arms between a folded position and an open position, whereby an animal carcass is retained to said first and second arms when folded to said open position.

17. Apparatus as set forth in claim 16 wherein said stop means comprises surfaces at said first and second arms which abut with one another and limit rotation of the arms at the open position to a substantially coaxial relationship.

18. Apparatus as set forth in claim 10 wherein each of said first and second arms is comprised of first and second portions which portions include surfaces which mate with one another at a plurality of positions and means for fastening the portions to one another at each position, whereby the length of each arm may be adjusted.

* * * * *